(12) United States Patent
Bauer et al.

(10) Patent No.: US 6,947,892 B1
(45) Date of Patent: Sep. 20, 2005

(54) METHOD AND ARRANGEMENT FOR SPEECH RECOGNITION

(75) Inventors: Josef Bauer, Munich (DE); Jochen Junkawitsch, Munich (DE)

(73) Assignee: Siemens Aktiengesellschaft, Munich (DE)

(*) Notice: Subject to any disclaimer, the term of this patent is extended or adjusted under 35 U.S.C. 154(b) by 533 days.

(21) Appl. No.: 09/642,452

(22) Filed: Aug. 18, 2000

(30) Foreign Application Priority Data

Aug. 18, 1999 (DE) .................. 199 39 102

(51) Int. Cl.$^7$ .................. G10L 15/04; G10L 15/20
(52) U.S. Cl. .................. 704/233; 704/253
(58) Field of Search .................. 704/231, 233, 704/234, 236, 251, 252, 253, 254

(56) References Cited

U.S. PATENT DOCUMENTS

| | | | | |
|---|---|---|---|---|
| 4,918,732 A | * | 4/1990 | Gerson et al. | 704/233 |
| 5,337,251 A | * | 8/1994 | Pastor | 702/70 |
| 5,732,190 A | * | 3/1998 | Hamasaki et al. | 704/233 |
| 5,848,388 A | * | 12/1998 | Power et al. | 704/239 |
| 5,970,452 A | * | 10/1999 | Aktas et al. | 704/253 |
| 5,991,718 A | * | 11/1999 | Malah | 704/233 |
| 6,044,342 A | * | 3/2000 | Sato et al. | 704/233 |
| 6,061,651 A | * | 5/2000 | Nguyen | 704/233 |
| 6,167,374 A | * | 12/2000 | Shaffer et al. | 704/227 |
| 6,216,103 B1 | * | 4/2001 | Wu et al. | 704/253 |
| 6,317,711 B1 | * | 11/2001 | Muroi | 704/253 |
| 6,324,509 B1 | * | 11/2001 | Bi et al. | 704/248 |
| 6,336,091 B1 | * | 1/2002 | Polikaitis et al. | 704/233 |
| 6,393,396 B1 | * | 5/2002 | Nakagawa et al. | 704/233 |
| 6,539,350 B1 | * | 3/2003 | Walker | 704/233 |
| 6,574,601 B1 | * | 6/2003 | Brown et al. | 704/270.1 |
| 6,606,594 B1 | * | 8/2003 | Sejnoha et al. | 704/250 |
| 6,757,652 B1 | * | 6/2004 | Lund et al. | 704/254 |

FOREIGN PATENT DOCUMENTS

| | | |
|---|---|---|
| DE | 41 06 405 | 9/1991 |
| DE | 44 22 545 | 1/1996 |

* cited by examiner

*Primary Examiner*—Martin Lerner
(74) *Attorney, Agent, or Firm*—Morrison & Foerster LLP

(57) ABSTRACT

A method and arrangement for speech recognition wherein a volume distance is determined between recognized words and the pauses lying between them. When the volume distance of a word is lower than a predetermined threshold, the word is evaluated as being incorrectly recognized, such that errors caused by unwanted noises are avoided.

13 Claims, 3 Drawing Sheets

US 6,947,892 B1

METHOD AND ARRANGEMENT FOR SPEECH RECOGNITION

BACKGROUND OF THE INVENTION

1. Field of the Invention

In general, the present invention is directed to speech recognition systems. In particular, the present invention is directed to automatic detection of speech recognition errors.

2. Discussion of the Related Art

Methods for automatic speech recognition are often utilized in speech recognition systems. Applications of speech recognition systems are, for example, dictating systems or automatically operating telephone exchanges.

It is especially critical in speech recognition that the correct expressions of the correct speaker are recognized. This is problematical insofar as an ambient noise in which clear speech constituents are contained can be interpreted such by a speech recognition system as though they derived from the speaker of the speech actually to be recognized. In order to prevent a mix-up, a method is herewith disclosed for distinguishing the correct form the incorrect spoken language. In particular, the level of the speaker whose speech is to be recognized is usually clearly higher than speech from the unwanted noise, which usually comes from the background. The volume level of the speaker whose speech is to be recognized can thus be used to distinguish this from the background noise.

Given previously known methods for the automatic recognition of speech recognition errors are frequently caused by unwanted noises. A distinction is made between two types of unwanted noises, namely the speech of another speaker that is in fact usually correctly recognized but that is not to be assigned to the voice signal of the actual speaker and a back-ground noise not representing a voice signal such as, breathing sounds, that is incorrectly recognized as speech. The unwanted noises represent a considerable source of error in the automatic recognition of speech.

In order to avoid such errors, speech recognition systems are trained to the speech of the individual speakers, so that the speech recognition system can determine whether the acoustic signal derives from the speaker or is a background noise. Speech recognition systems having frequently changing speakers cannot be trained for every individual speaker. Given a speech recognition system integrated in a telephone system, thus, it is impossible to carry out a training phase lasting a number of minutes for every caller before the caller can speak his message, which often lasts only a fraction of a minute.

SUMMARY OF THE INVENTION

It is an object of the present invention to provide a method for enabling recognition of speech wherein recognition errors produced by unwanted noises are reduced.

It is another object of the invention to provide a method for determining words and pauses on the basis of word boundaries.

It is a further object of the invention to provide a method wherein an average silence volume can be determined during speech pauses.

It is an additional object of the invention to provide a method to determine average word volume.

It is yet another object of the invention to provide a method to determine a difference between the average word volume and the average silence volume.

It is yet a further object of the invention to provide a method wherein speech is recognized when a difference between an average word volume and an average silence volume is greater than a predetermined threshold.

These and other objects of the invention will become apparent upon careful review of the following disclosure, which is to be read in conjunction with review of the accompanying drawing figures.

DETAILED DESCRIPTION OF THE PREFERRED EMBODIMENTS

Figure 1:
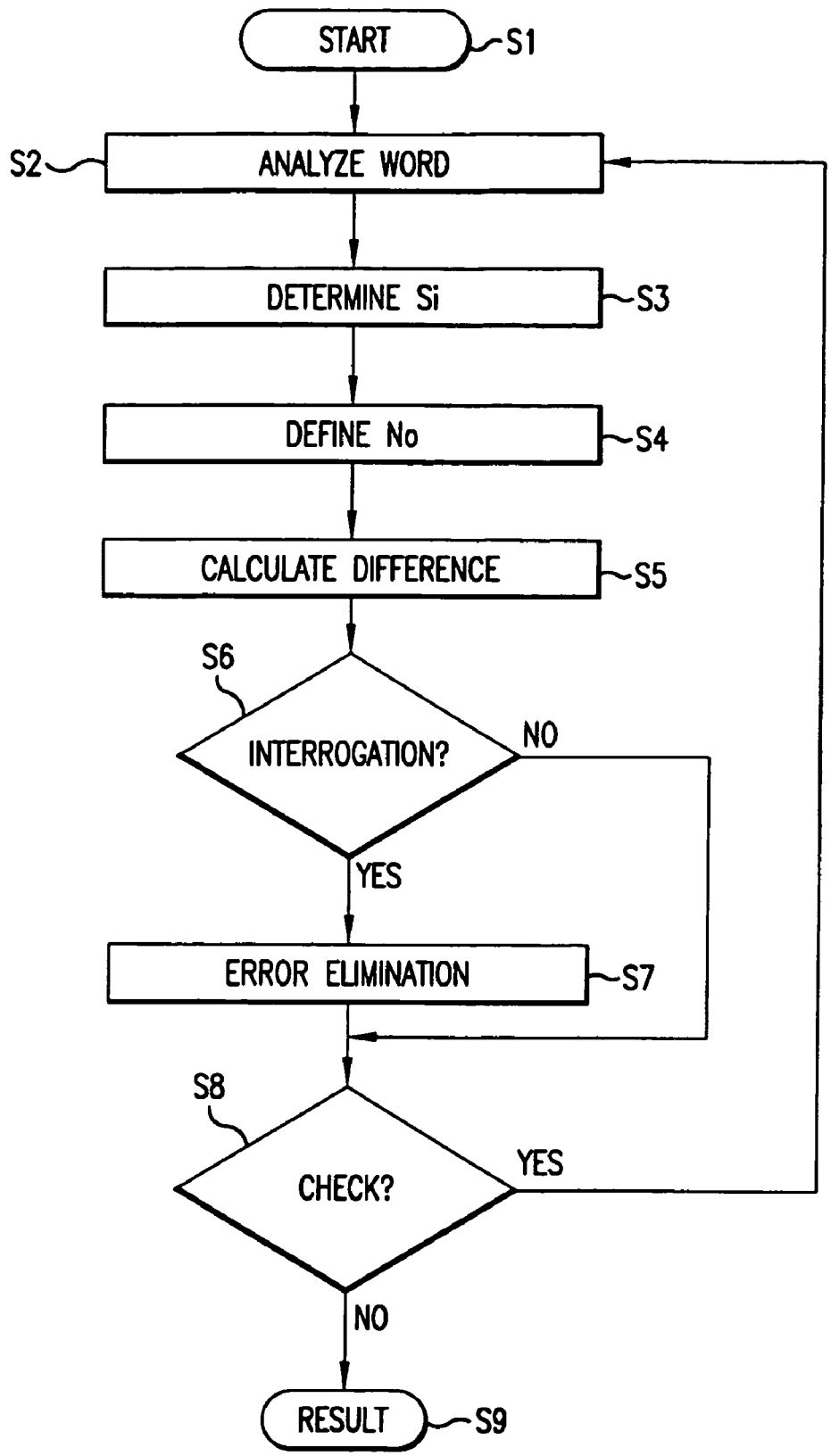
FIG. 1 shows a flowchart according to the present invention.

FIG. 1 schematically shows a method for the automatic recognition of speech. This method is realized in practice by a computer program that works on a computer or a processing unit comprising an input for a voice signal.

The method is started in Step S1. In the following Step S2, a word of a speech signal S is analyzed. This analysis continues such that the acoustic voice signal which is usually present as a signal converted into an electrical signal, is segmented into words and pauses and the words are converted into text. The segmentation of the signal section is sometimes referred to as the Viterbi alignment method.

An average silence volume (Si level) is determined during the pauses. An average word volume (Wo level) for the words is also determined. Further, a difference ($\Delta$) between the average word volume (Wo level) and the average silence volume (Si level) is also determined. Speech is recognized when the difference ($\Delta$) between the average word volume (Wo level) and the average silence volume (Si level) is greater than a predetermined threshold (S). Otherwise, a recognition of speech is not carried out in this range.

The difference $\Delta$ forms a volume distance between the spoken words and the noises in the pauses. When the volume distance of a recognized word is too slight, it is interpreted as an incorrectly recognized word. A determination is thus made as to whether a word has a predetermined volume distance from the remaining noise level. Background noises that often lead to incorrect recognitions in traditional methods for automatic speech recognition are not as loud as the words spoken by the speaker. These background noises can simply be filtered out with using the method of the present invention, regardless of whether they contain words or are noises that do not represent a voice signal.

The method of the present invention can also be used such that only the average volume need be determined over parts of the speech signal segment to be analyzed.

The term volume refers to any physical quantity that is approximately proportional to the physical volume measured in decibels. Proportional quantities relating thereto are the energy of the acoustic signal or, respectively, of an electrical signal such as, for example, voltage or the current.

Figure 2:
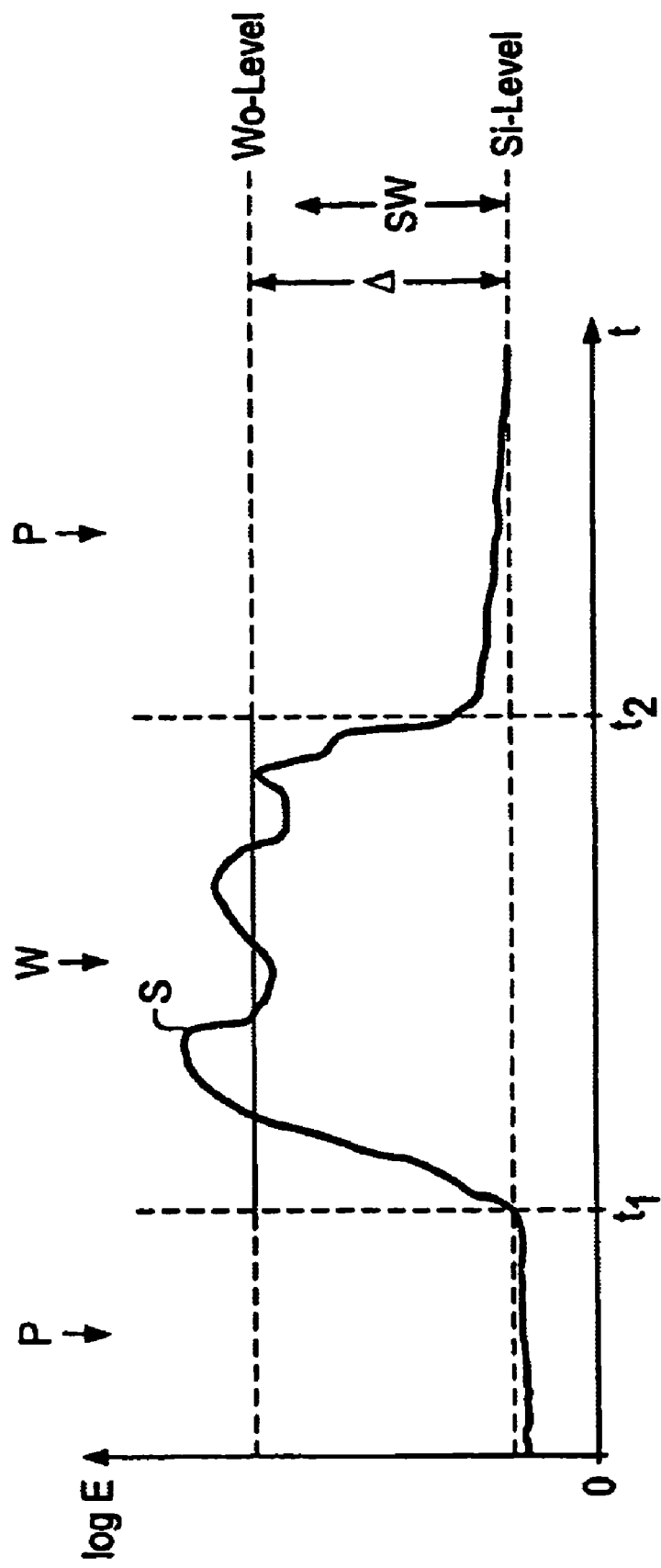
FIG. 2 shows a part of a signal segment according to the present invention.

FIG. 2 shows a diagram of a signal segment S in a coordinate system. In this coordinate system, a time t is entered on the abscissa and the volume is entered on the ordinate. The volume is recited as logarithm of the energy E of the signal S. Quantities proportional to this are, in addition to the energy of the signal segment S, the electrical quantities of the acoustic signal converted into an electrical signal such as, voltage or current.

In the segmentation of the signal segment S, points in time t1, t2 are defined that respectively define a boundary between a pause P and a word W. A pause is present between the point-in-time zero and t1 or, following point-in-time t2 and the signal S represents a word between the points-in-time t1 and t2.

An average silence volume Si level is determined in Step S3. The average silence volume Si level is the chronological average of the volume of one or more pause segments P.

In Step S4, an average word volume Wo level defined. Average word volume Wo level is the chronological average of the volume of an individual word segment W. I.e., a separate Wo level is calculated for each individual word.

In the following Step S5, a difference $\Delta$ is calculated between the average word volume Wo level and the average silence volume Si level:

$$\Delta = Wo\text{-}Level - Si\text{-}Level$$

Subsequently, an interrogation is carded out in Step S6 to see whether the difference $\Delta$ is lower than a threshold SW. The threshold SW represents "volume distance" (also see FIG. 2).

When this increase shows that the difference $\Delta$ is smaller than the threshold SW, then this means that the volume distance between the average word volume Wo level and the average silence volume Si level is less than the predetermined threshold SW. The word whose volume distance between the average word volume Wo level and the average silence volume Si level is lower than the predetermined threshold SW is evaluated as having been incorrectly recognized, since the inventors of the present invention have found that the unwanted noises are usually not as loud as the word signals to be evaluated or that, given a constant unwanted noise (noise in the line, loud background noise) where in no satisfactory speech recognition is possible, the volume distance between the average word volume and the average silence volume is extremely slight. When the acquired signal is converted into a text in both instances, it almost always results in an incorrect recognition. When the inquire in Step S6 yields that the difference $\Delta$ is lower than the threshold SW, the program execution is branched to the Step S7 wherein an error elimination is implemented, this being explained later.

Subsequently, a check is carried out in Step S8 to see whether a further word is to be evaluated. When the result in Step S6 is that the difference $\Delta$ is greater than the threshold SW, the program execution is directly branched onto an inquiry in Step S8.

A check is carried out with the inquiry in Step S8 to see whether a further word is yet to be analyzed and to be interpreted and, if the result in "yes", the program execution is branched back onto the Step S2; otherwise, the program is ended with Step S9.

Acquired words are individually analyzed, converted into text and interpreted. This method is referred to as pace-keeping recognition. It is thereby expedient that the difference $\Delta$ between the average word volume Wo level of a word W and the average silence volume Si level o of the immediately preceding pause P is formed. However, it is also possible to employ the average silence volume of the pause following the word W or to employ a silence volume averaged over the preceding or the following pause.

Instead of a pace-keeping recognition, a recognition combining several words can also be employed. A complete sentence is thereby usually respectively to be registered as signal segment and to be then analyzed of a piece (sentence-by-sentence recognition). Given such a sentence-by-sentence recognition, the silence volume can be averaged over all pauses P, whereby the average word volume is to be individually determined for each word W, so that the individual words can be evaluated as correctly or incorrectly recognized.

Dependent on the application, there are various versions in the error elimination in Step S7 which can be utilized individually or in combination.

Words that have been evaluated as incorrectly recognized are not taken into consideration in the conversion into a text or are removed therefrom.

According to a second version of error elimination, a corresponding message is output to the user given a word deemed incorrectly recognized. The message can be output as an acoustic message (for example, "the last word was not correctly understood") or can be displayed as a graphic display. The former is expedient for speech recognition systems without display such as, for example, telecommunication system with automatic speech recognition and the second can be meaningful, for example, given a dictating system. In dictating systems, a predetermined error character can be inserted at the corresponding location in the text as a graphic presentation, the user being prompted therewith to speak the word again, this then being automatically introduced at the location of the error character in the text. When the user does not wish to insert a word for this, he can actuate a correspondingly delete function for illuminating the error character.

According to a third version of the error illumination, the user can be prompted by a corresponding message to speak louder, so that the required volume distance is achieved. As a result thereof, an adaptation of the voice input to the acoustic conditions (noise level by the speaker) or, respectively, the conditions of the transmission (noise on the line) of the acoustic signal ensues. When a repeated prompt to speak louder does not lead to an improved recognition result, the user can also be prompted to create different acoustic conditions or, respectively, transmission conditions in that, for example, the user is requested to telephone from a different telephone set if the user is connected to the speech recognition system via a telephone.

According to a fourth version of the error elimination given a plurality of words successively evaluated as incorrectly recognized, this is evaluated as inadequate quality of the speech input and is indicated to the user with a corresponding message.

According to a fifth version of the error elimination, the words of what are referred to as n-best lists are individually interpreted. Often, a number of words that sound similar can be allocated to a signal sequence. These words form the n-best lists. Since the boundaries between the pauses and the respective word given the individual words of the n-best list differ, average word volumes and, accordingly, different differences $\Delta$ can be determined for the individual words of the n-best list.

The selection of the word of the n-best list that is inserted into the text ensues according to known match criteria, whereby the difference $\Delta$ can be inventively employed as an additional match criterion, whereby the word having the greatest difference $\Delta$ is inserted into the text. This fifth version of the error elimination forms an independent idea of the invention that can also be utilized in the automatic evaluation of n-best lists independently of the above-described method.

The selection of the word of the n-best list that is inserted into the text ensues according to known match criteria, whereby the difference Δ can be inventively employed as an additional match criterion, whereby the word having the greatest difference Δ is inserted into the text. This fourth version of the error elimination forms an independent idea of the invention that can also be utilized in the automatic evaluation of n-best lists independently of the above-described method.

The threshold SW is constant. However, it is also possible to automatically adapt the threshold SW to the acoustic conditions and to the signal transmission conditions. When there are excellent acoustic conditions and signal transmission conditions, then high differences Δ are usually achieved, these being significantly higher then constant thresholds that must be suitable for different applications and conditions. In such a case, it is then expedient when the threshold is adapted to the higher differences Δ. Thus, for example, a global difference Δg1 can be calculated between the average word volume of a plurality of acquired words and the average silence volume of a plurality of acquired pauses, and this global difference Δg1 can be employed as threshold SW, either directly or after the subtraction of a predetermined, constant amount. This is particularly useful in combination with the first version of the error elimination since background noises can also be filtered out as a result thereof, these being only slightly softer than the average word volume. The result thereof is that, given a speech input with high quality, the threshold below which the signals are evaluated as incorrectly recognized words is set higher than given a speech input with poorer quality. Preferably, a lower limit is provided for the threshold, so that this cannot be reduced to zero.

The height of the variable threshold can also be evaluated as quality factor of the speech input. When the variable threshold reaches its lower limit, then this means that the quality of the speech input is relatively poor, which can be correspondingly communicated to the user.

In the calculation of the global difference, all pauses and words that are spoken during a conversation with the speech recognition system are preferably taken into consideration.

Figure 3:
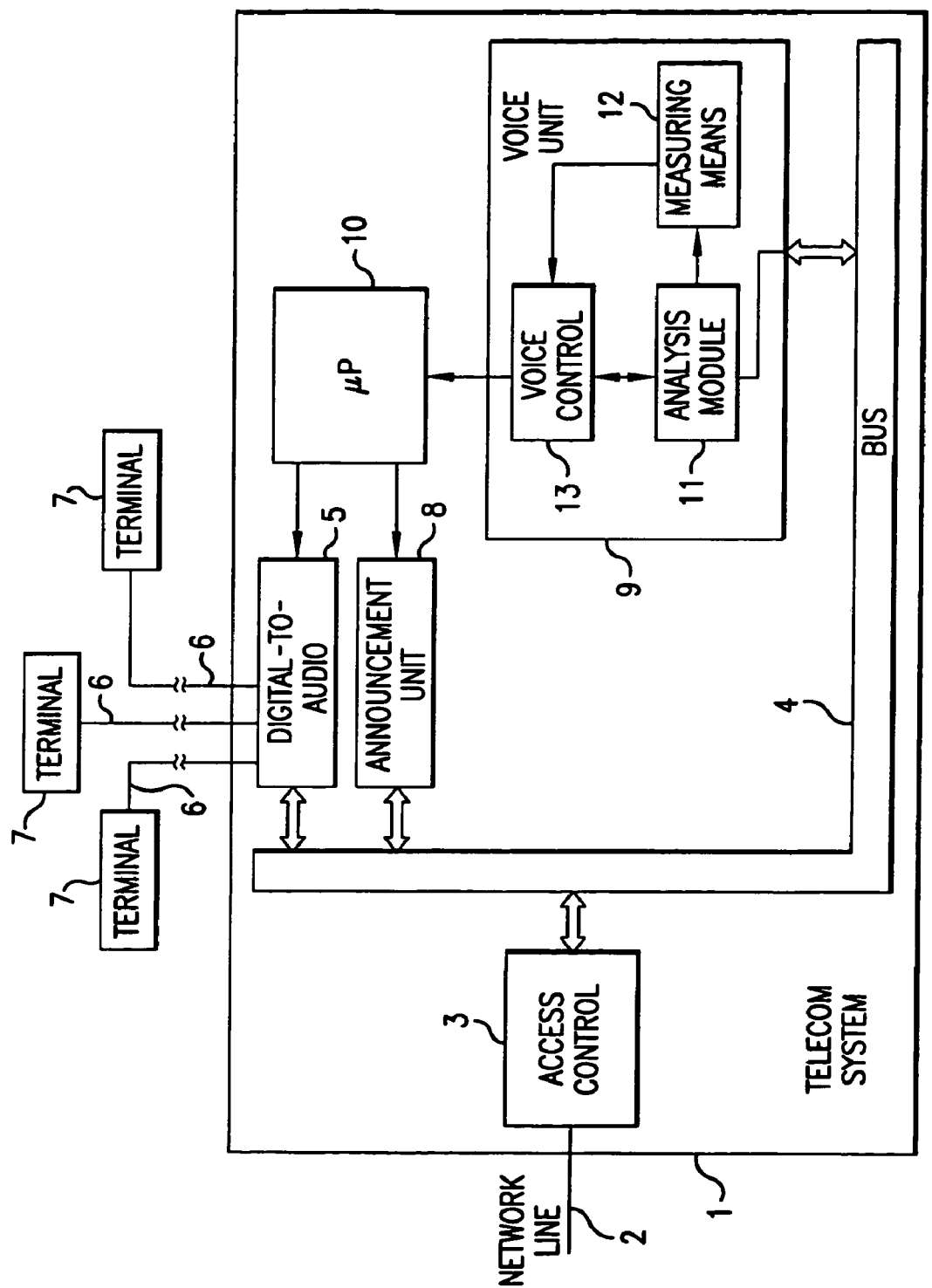
FIG. 3 shows a circuit diagram of a telecommunication system according to the present invention.

FIG. 3 shows an exemplary embodiment of an apparatus for speech recognition. This apparatus is a telecommunication system 1 that is connected to the telephone network via a network line 2. The telecommunication system 1 comprises a subscriber access control 3 with which telephone subscribers calling from the outside can be connected via an internal bus 4, a digital-to-audio processor 5 and local telephone lines 6 to a telephone terminal 7 or, respectively, to the user using the telephone terminal. The internal bus 4 is connected to an announcement unit 8 and to a voice unit 9. Announcements can be introduced onto the bus 4 and, thus, onto the telephone lines 2, 6 with the announcement unit 8. The telecommunication system is controlled by a microprocessor 10 that is connected to the digital-to-audio processor 5, to the announcement unit 8 and to the voice unit 9.

The voice unit 9 is composed of a speech analysis module 11, a volume measuring means 12 and a voice control 13.

The speech analysis module 11 carries out the analysis of the voice signal, whereby the voice signal is segmented into pauses and words and the words are converted into text. The speech analysis module conducts the individual parts (words W and pauses P) of the speech signal S to the volume measuring means 12 and forwards the converted text to the voice control 13. The volume measuring means determines the average volume (Wo level, Si level) of the individual parts of the speech signal and forwards the corresponding values to the speech control 13. A check is carried out in the speech control 13 to see whether the individual words have been correctly recognized (Step S6 in FIG. 1), whereby filtering incorrectly recognized words is potentially undertaken in the speech control 13 (first version of the error elimination).

The filtered or unfiltered text is forwarded from the speech control 13 together with further data needed for the error elimination to the microprocessor 10 that evaluates the received text and the corresponding data.

One function of the microprocessor 10 is to automatically connect the incoming calls to the respective telephone terminals 7. This ensues by interpreting the text received from the speech control 13 and by enabling the respective output of the digital-to-audio processor 5.

When the received text cannot be interpreted or when an error elimination with announcements (second, third or fourth version) is necessary, then the announcement unit 8 is driven by the microprocessor to implement the corresponding announcement.

An automatic switching is thus integrated into the inventive telecommunication system, this being capable of automatically forwarding incoming telephone calls to the respective telephone terminals.

The telecommunication system 1 also makes it possible that the users of the telephone terminals 7 control the telecommunication system 1 with their voice and, for example, speak the number to be selected instead of typing it on the keys.

All of these functions assume an optimally error-free speech recognition. As a result of the invention, errors due to background noises, whether as a result of a speech signal in the background or a noise that does not represent a speech signal, can be avoided significantly better and in a simpler way than given traditional speech recognition systems.

Although modifications and changes may be suggested by those skilled in the art to which this invention pertains, it is the intention of the inventors to embody within the patent warranted hereon all changes and modifications that may reasonably and properly come within the scope of this invention.

What is claimed is:

1. A method for speech recognition, comprising:
performing a preliminary speech recognition of a voice signal to segment the voice signal into words and pauses and converting the words into text;
determining an average silence volume during the pauses;
determining an average word volume for the words;
calculating a difference between the average word volume and the average silence volume;
evaluating a word, having a volume difference between the average word volume and the average silence volume is lower than a predetermined threshold, as having been incorrectly recognized; and
preparing an n-best list and allocating to each word of the n-best list a difference between the average word volume of individual spoken words and the average silence volume, and determining the word to be inserted into the text from the n-best list according to a criterion of the difference between the average volume of the individual spoken words and the average silence volume.

2. The method according to claim 1, further comprising measuring the average silence volume and the average word volume as a logarithm via an acquired energy.

3. The method according to claim 2, further comprising calculating the global difference between the average word volume of a plurality of segmented words and the average silence volume of a plurality of segmented pauses, and defining a threshold on the basis of the global difference.

4. The method according to claim 3, further comprising equating the threshold with the global difference.

5. The method according to claim 3, further comprising diminishing the global difference by a constant predetermined amount and deriving therefrom a volume amount as the threshold.

6. The method according to claim 2 further comprising employing a constant threshold.

7. The method according to claim 6, wherein a word for which no speech recognition is implemented is not taken into further consideration.

8. The method according to claim 7, wherein a message is output to a user when no speech recognition is implemented.

9. The method according to claim 8, further comprising prompting a user with a message to speak louder and/or to repeat an unrecognized word.

10. The method according to claim 9, further comprising prompting a user with a message to speak louder so that an adequate distance is achieved between the average word volume and the average silence volume.

11. The method according to claim 10, further comprising determining the average silence volume for an individual pause and determining the difference between the average word volume and the average silence volume of an immediately preceding pause or an immediately following pause.

12. The method according to claim 11, further comprising averaging the average silence volume over a plurality of successive pauses and employing the average in the determination of the difference between the average word volume and the average silence volume.

13. A system for speech recognition, comprising:

a processor unit configured to perform a preliminary speech recognition of a voice signal to segment words and pauses in speech based on word boundaries and converting the words into text, determine an average silence volume during the pauses, determine an average word volume for the words, and calculate a difference between the average word volume and the average silence volume, whereby speech is recognized when the difference between the average word volume and the average silence volume is greater than a predetermined threshold, and an n-best list is prepared and each word of the n-best list is allocated a difference between the average word volume of individual spoken words and the average silence volume and the word to be inserted into the text from the n-best list is determined according to a criterion of the difference between the average volume of the individual spoken words and the average silence volume.

* * * * *